US006629762B2

United States Patent
Okamoto et al.

(10) Patent No.: US 6,629,762 B2
(45) Date of Patent: Oct. 7, 2003

(54) ELECTRIC FIELD SENSOR USING LIQUID CRYSTAL AND THREE-DIMENSIONAL MOVIE PLAYER/RECORDER USING THE SAME

(75) Inventors: Koichi Okamoto, Kyoto (JP); Yoichi Kawakami, Kusatsu (JP)

(73) Assignees: Fumio Suzuki, Kyoto (JP); Toko, Co., Ltd., Tokyo-to (JP); Shigeo Miyazato, Ikeda (JP); Akifumi Sakai, Okazaki (JP)

( * ) Notice: Subject to any disclaimer, the term of this patent is extended or adjusted under 35 U.S.C. 154(b) by 3 days.

(21) Appl. No.: 10/277,189

(22) Filed: Oct. 22, 2002

(65) Prior Publication Data

US 2003/0048392 A1 Mar. 13, 2003

Related U.S. Application Data

(62) Division of application No. 09/702,832, filed on Nov. 2, 2000, now abandoned.

(30) Foreign Application Priority Data

May 14, 1999 (JP) .......................................... 11-134880

(51) Int. Cl.⁷ .............................................. G03B 21/00
(52) U.S. Cl. ............................... 353/122; 349/7; 359/7
(58) Field of Search .............................. 353/7, 30, 122, 353/31; 349/2, 5, 15, 7, 199; 359/7, 10, 11, 26; 348/266, 272

(56) References Cited

U.S. PATENT DOCUMENTS

| 4,838,653 | A |   | 6/1989 | Mohebban |
| 5,235,437 | A | * | 8/1993 | Katagiri et al. ............. 358/471 |
| 5,317,435 | A | * | 5/1994 | Kasazumi et al. ............ 349/2 |
| 5,506,701 | A | * | 4/1996 | Ichikawa .................... 359/15 |
| 5,966,112 | A |   | 10/1999 | Ktagiri et al. |
| 6,115,012 | A |   | 9/2000 | Eguchi et al. |
| 6,404,464 | B1 | * | 6/2002 | Faris et al. .................. 349/15 |

FOREIGN PATENT DOCUMENTS

| JP | 402302733 A | 12/1990 |
| JP | 6-289399 | 10/1994 |
| JP | 10-222045 | 8/1998 |
| JP | 11-6983 | 1/1999 |

* cited by examiner

Primary Examiner—Willaim Dowling
(74) Attorney, Agent, or Firm—Oliff & Berridge, PLC

(57) ABSTRACT

Liquid crystal is filled between a pair of transparent plate electrodes, and a DC voltage is applied between the electrodes to align the liquid crystal molecules along the electric field. When light enters the liquid crystal cell, the alignment of the liquid crystal molecules deviates due to the electric field of the light. The change in the alignment of the liquid crystal molecules is detected by a change in the capacitance or in the electric resistance between the plate electrodes. A liquid crystal panel 35 constituted by a two-dimensional array of such liquid crystal cells is used as an image sensor, and the interference patterns of an object 38 are produced on and detected by the liquid crystal pattern 35 in real time. The detected interference patterns are recorded continuously, whereby a three-dimensional movie is recorded. In playing, while the recorded interference patterns are reproduced on the same liquid crystal panel 35, a reading coherent light beam is irradiated onto the liquid crystal panel 35, whereby a three-dimensional movie is viewed. By switching lights from the three primary color light sources by a beam chopper, interference patterns of the three colors are successively produced and recorded, whereby a three-dimensional color movie is recorded. The recorded interference patterns are reproduced on the liquid crystal panel 35 and the three color lights are orderly irradiated onto the liquid crystal panel 35 by the synchronous movement of the beam chopper, whereby the three-dimensional color movie is reproduced.

2 Claims, 3 Drawing Sheets

ELECTRIC FIELD SENSOR USING LIQUID CRYSTAL AND THREE-DIMENSIONAL MOVIE PLAYER/RECORDER USING THE SAME

The present invention relates first to an electric field sensor or an electro-magnetic wave sensor using liquid crystal, and then a line sensor and an image sensor using a linear and two-dimensional array of such sensors. The same construction of the liquid crystal of a microscopic size can also function as an optical modulator. So the present invention further relates to a movie player/recorder using such liquid crystal as an image sensor and as an optical modulator.

BACKGROUND OF THE INVENTION

A liquid crystal cell is in many cases used as an actuator to pass or stop light, and especially as a display with a segment structure or with a fine two-dimensional cell array structure. In some cases, it is also used as a sensor. As a sensor, it is mostly used as a temperature sensor utilizing the characteristic change due to the temperature change or an electric field/magnetic field sensor utilizing the characteristic change due to the change in the temperature and the electro-magnetic field combined.

In the Publication No. H6-289399 of the Japanese Patent Application, a liquid crystal cell sensitive to the change in the magnetic field is disclosed. The liquid crystal cell is made of ferroelectric liquid crystal contained in two outer plates, each of which is made of a transparent base plate, a transparent electrode layer, and an alignment layer. The alignment layer is placed inside of the cell, and at least one of the alignment layer is photo-excitable (i.e., can be excited by a photon-irradiation). When the liquid crystal cell is slowly cooled from the isotropic temperature while a DC (direct current) voltage larger than a certain threshold value is applied between the electrode layers, the spontaneous polarizing direction of the ferroelectric liquid crystal molecules uniformly aligns. Then, a DC voltage of the opposite direction to the previous one having the magnitude below the threshold value is applied to the liquid crystal cell. When, under such a reverse-biased condition, a light beam is spotted on a preferred place, the photo-excitable plastic in the alignment layer of the spotted area is excited, and the polarizing direction of the ferroelectric liquid crystal molecules adjacent to the alignment layer is reversed. Since, as a result, the direction of the long liquid crystal molecules differs between those in the light-spotted area and those in the unspotted area, data can be recorded using the dark part in the unspotted area and the bright part with an oblique liquid crystal molecules in the light spotted area by properly setting the Cross-Nicol liquid crystal angle.

In the JPA Publication No. H10-222045, a three-dimensional color movie recorder/player is disclosed. In the recorder/player, pulse lasers of three primary colors are used, and the interference image of the object light and the reference light is formed in a time-splitting manner for every color. The interference images are recorded by photoelectric image sensor. A color movie is reproduced in the same time-splitting manner from the recorded data using similar pulse lasers of the three primary colors.

In the JPA Publication No. H11-006983, a movie playing method using a variable diffraction grating is disclosed. In the variable diffraction grating, the diffracting condition of light gradually changes from line to line. A movie is reproduced by moving the variable diffraction grating according to the data of the movie.

SUMMARY OF THE INVENTION

In the liquid crystal cell disclosed in the JPA Publication No. H6-289399, the ferroelectric liquid crystal is heated above the isotropic temperature and a DC voltage larger than a certain critical value is applied so that the ferroelectric liquid crystal molecules align according to the direction of the applied voltage. When the liquid crystal is cooled below the isotropic temperature, the alignment of the ferroelectric liquid crystal molecules is frozen. When in such a state a light beam is spotted on the liquid crystal, the alignment of the liquid crystal molecules changes in the spotted area, whereby data is recorded. In summary, the liquid crystal cell disclosed in the JPA Publication No. H6-289399 is a recording device and may not be used as a sensor for detecting a dynamically changing electric field.

In the first feature of the present invention, an electric field sensor of a liquid crystal cell is provided. The inventive sensor is applicable, as easily understood, to an electro-magnetic sensor, a line sensor, an image sensor, etc.

In the inventive electric field sensor, an electric field is detected as follows. Liquid crystal is filled between a pair of parallel plate electrodes, and a DC voltage is applied between the pair of plate electrodes for the molecules of the liquid crystal to align perpendicular to the plane of the plate electrodes. When an electric field having a component parallel to the plane of the plate electrodes is applied, a deviation from the alignment of the liquid crystal molecules occurs. The deviation of the alignment is detected by a change in the capacitance or a change in the electric resistance between the pair of plate electrodes, whereby the electric field is detected by the liquid crystal cell.

Since a liquid crystal molecule 11 is an electrically polarized long molecule, the liquid crystal molecules 11 align, as shown in FIG. 1A, perpendicular to the plate electrodes 12 and 13 when a DC voltage is applied between the plate electrodes 12 and 13. When another electric field is applied oblique to that produced by the pair of plate electrodes 12 and 13, the alignment of the liquid crystal molecules 11 deviates from the normal position as shown in FIG. 1B. When the alignment of the liquid crystal molecules 11 deviates from the normal position, the capacitance and the electric resistance between the pair of plate electrodes 12 and 13 change. By detecting either one of the physical properties using an appropriate known circuit including the plate electrodes 12 and 13, the change in the externally applied electric field is detected.

The time (recovery time) necessary for the liquid crystal molecules 11 to return to the normal (original) state perpendicular to the plate electrodes 12 and 13 from the deviated state depends on the physical properties of the liquid crystal and the magnitude of the DC voltage applied between the plate electrodes 12 and 13. By using liquid crystal having adequately short recovery time (or having adequately high responsibility) and by applying an adequately high DC voltage between the plate electrodes 12 and 13, a high-speed electric field sensor that can respond to a high-speed change in the electric field can be made. Since the electro-magnetic wave is a transverse wave in which the electric field oscillates perpendicular to the propagating direction of the electro-magnetic wave, the inventive electric field sensor may be used as an electro-magnetic wave sensor for detecting the wave propagating perpendicular (or nearly perpendicular) to the plane of the plate electrodes 12 and 13.

As the frequency of the electro-magnetic wave becomes higher, it becomes more difficult for the liquid crystal molecules to follow the changing speed of the electric field.

In this case, the detecting method may be changed so that the vibration of the liquid crystal molecules due to the electro-magnetic wave is detected by the change in the capacitance or the electric resistance between the plate electrodes.

Since infrared and visible lights are included in the electro-magnetic wave, the above described inventive electro-magnetic wave sensor may be used as a photo-sensor (including an infrared sensor). In this case, transparent electrodes such as using ITO (Indium Tin Oxide) should be used.

By arraying small cells of such liquid crystal electro-magnetic wave sensor as described above in a row, a line sensor is made, and by arraying such small cells two-dimensionally, an image sensor is obtained. Since every cell can be made of a dynamic (or high-speed) electro-magnetic wave sensor cell, the line sensor and the image sensor can be used as a dynamic sensor (movie sensor).

As for recording and playing of a three dimensional movie, the method disclosed in the JPA Publication No. H10-222045 uses, on one hand, a normal photo-electric image sensor for recording an interference pattern. The method uses, on the other hand, a liquid crystal panel in playing the recorded interference pattern to reproduce a color movie. That is, the method uses two different devices in recording and in playing, which requires a complicated total system and hence a subtle matching adjustment between the recording device and the playing device is necessitated.

In the second feature of the present invention, a single and simple system using a two-dimensional array of the above cited liquid crystal cells is provided for recording and playing a three dimensional movie by itself. A two-dimensional array of liquid crystal cells of a microscopic size can be used as a dynamic valuable non-mechanical optical modulator.

That is, an interference pattern is recorded by a liquid crystal panel of the above-described image sensor of the present invention, and the same liquid crystal panel is also used as an optical modulator for playing the interference pattern to reproduce the recorded three-dimensional movie. Thus the inventive system first includes a liquid crystal panel which is composed of a two-dimensional array of small cells functioning as an image sensor. On the inner faces of the pair of plate electrodes constituting the liquid crystal panel are provided alignment layers having the same aligning direction. The system also includes a coherent light source for generating a coherent light, a light splitter for splitting the light from the coherent light source into two beams, and a recorder for recording an image data of the interference pattern sent out from the image sensor.

A three-dimensional movie is recorded in the system as follows. The coherent light from the light source is split into two beams, and one of which is irradiated onto an object and the other is irradiated onto the liquid crystal panel image sensor as a reference light. A part of the light irradiated onto the object is reflected by the object and comes to the image sensor as an object light. The object light is superposed on the reference light on the liquid crystal panel image sensor and generates an interference pattern on it. The interference pattern includes the information of the three dimensional shape of the object. The interference pattern is detected by the image sensor and the data of the interference pattern is recorded in the recorder. Thus the three dimensional image is recorded in the inventive system. Since the liquid crystal panel image sensor of the present invention can detect a moving image, a three-dimensional movie can be recorded by concurrently recording the continuously changing interference pattern.

Reproduction of the three-dimensional movie is achieved almost in the reverse direction of the above process, as follows. The recorded interference pattern is continuously played on the liquid crystal panel (which was used as an image sensor in the recording mode) while the reference light is cast onto the liquid crystal panel, whereby a viewer of the liquid crystal panel perceives a three-dimensional movie.

It is possible to construct a color version of the above-described three-dimensional movie recording/playing system. In the three-dimensional color movie system, three coherent light sources for the three primary colors and a light chopper is provided besides the elements used in the above monochromatic system.

In recording, the chopper allows one of the three primary color light from the three light sources pass at a time, and allows the next color light pass the next moment. Thus the light chopper switches the three primary color coherent lights one from another cyclically at a high speed. Every primary color passing the light chopper generates an interference pattern on the liquid crystal panel as described above and the interference pattern of the color of the moment is recorded in the recorder. Thus a three-dimensional color movie is recorded.

In playing, the light chopper is controlled to synchronize with the timing of recording so that every picture of the moment is reproduced from the interference pattern using the reference light of the appropriate color. Continuous reproduction of such pictures gives the viewer the perception of a three-dimensional color movie.

As a sensor, the liquid crystal panel with microscopic sized cells is used not only for recording a three-dimensional movie, but also for various optical devices, for example, an optical memory with very high density, or a real-time observation device of a microscopic image, etc.

As a dynamic valuable non-mechanical optical modulator, the liquid crystal panel with microscopic sized cells can be used in broader applications, such as for optical fibers, photonic bandgap structures or nonlinear optical materials.

Thus the microscopic liquid crystal panel may be one of the basic optical technologies in the future.

DETAILED DESCRIPTION OF PREFERRED EMBODIMENTS

Figure 1A:
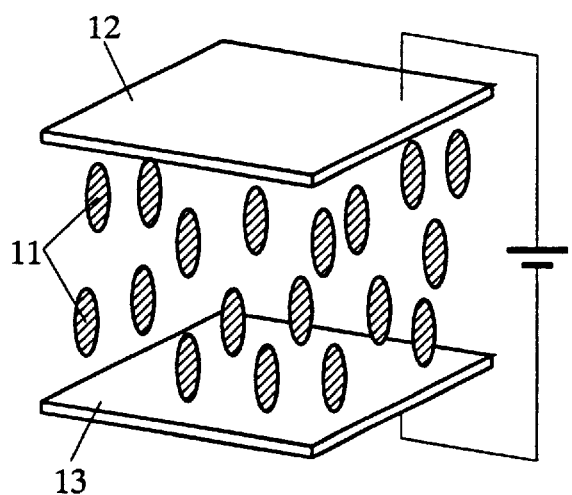
FIGS. 1A and 1B are figures explaining a liquid crystal electric field sensor of the present invention.
Figure 1B:
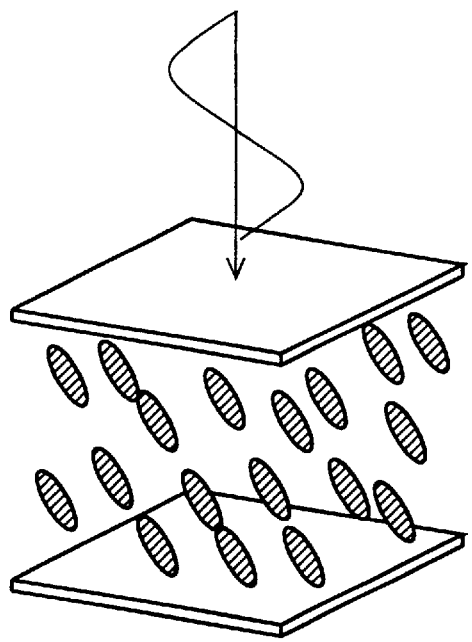
Figure 2A:
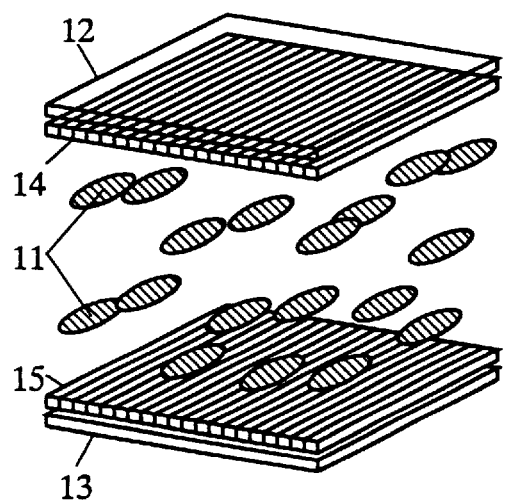
FIGS. 2A and 2B are figures explaining a cell of the liquid crystal panel used in a three-dimensional movie system of the present invention.
Figure 2B:
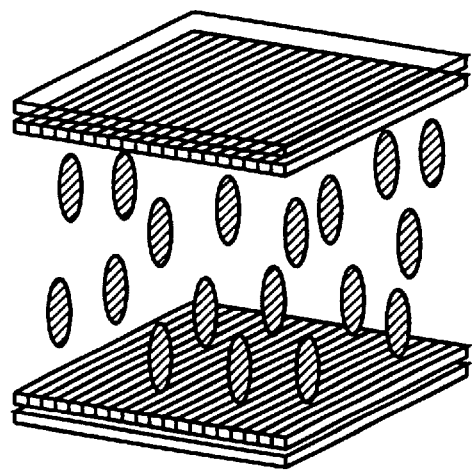
Figure 3:
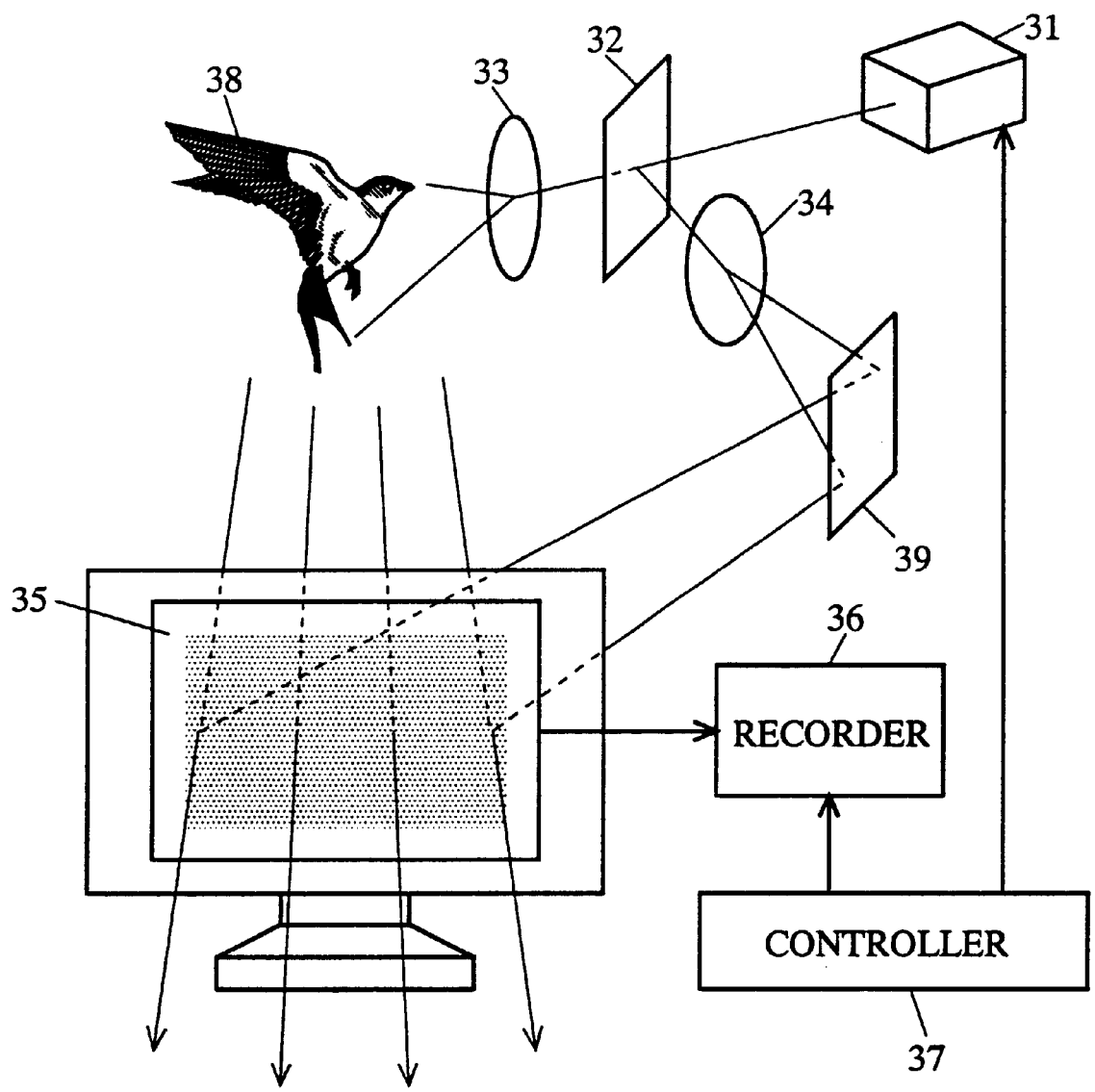
FIG. 3 is a system construction diagram of a monochromatic three-dimensional movie system in recording.

An embodiment of the second feature of the present invention is described with reference to FIGS. 2A–4. As shown in FIG. 3, the system includes: a laser light source 31 as a coherent light source; a beam splitter 32 for splitting the laser light; a beam expander 33, 34 for expanding the thickness (diameter) of the laser beam; a liquid crystal panel 35 as an image sensor and player; a recorder 36 for recording interference patterns; and a controller 37 for controlling the entire system. For the liquid crystal panel 35, that of cell size having 0.3–1 micrometers is used. In every cell of the liquid crystal panel 35, as shown in FIGS. 2A and 2B, the alignment layers 14 and 15 on the inner surfaces have the same aligning direction. The reason will be explained later.

A monochromatic movie is recorded as follows. As shown in FIG. 3, a laser light beam generated by the light source 31 is split by the beam splitter 32 into two light beams. One light beam is irradiated onto an object 38, and the other light beam (reference light) is reflected by a mirror 39 and is irradiated onto the liquid crystal panel 35. The laser light irradiated onto the object 38 is reflected by the object 38 and a part of the reflected light (object light) also arrives at the liquid crystal panel 35. Both light beams arriving at the liquid crystal panel 35 had been split from the same light beam and had the same phase, but every ray of the object light beam bears a phase shift depending on the distance between every point of the surface of the object and the surface of the liquid crystal panel. When the object light beam is superposed on the reference light beam, an interference pattern bearing the information of the three-dimensional shape of the object is generated on the surface of the liquid crystal panel 35. The interference pattern is detected by the liquid crystal panel 35, is converted to electric signals and is recorded in the recorder 36. A movie can be recorded by recording the interference patterns (frames) at the normal frame speed (30 Hz) of a movie.

Figure 4:
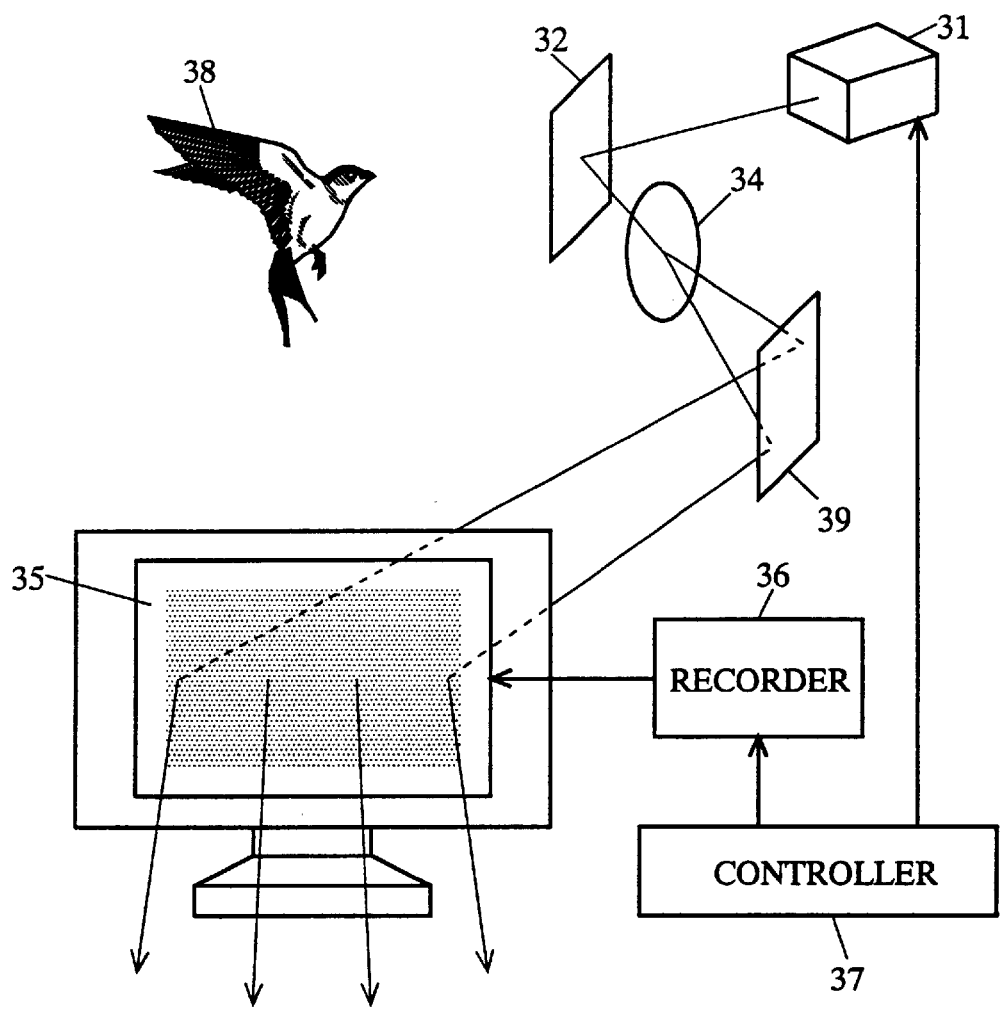
FIG. 4 is a system construction diagram of a monochromatic three-dimensional movie system in playing.

The movie is played as follows. As shown in FIG. 4, the liquid crystal panel 35 is driven to reproduce every frame (interference pattern) of the recorded movie on the liquid crystal panel 35. As described before, the direction of the alignment layers 14 and 15 on the inner surfaces of the liquid crystal panel 35 is the same, the liquid crystal molecules 11 align along the direction when no voltage is applied (FIG. 2A). By applying a DC voltage larger than a certain value between the electrodes (transparent electrodes) 12 and 13, the liquid crystal molecules 11 having electric polarities align along the electric field generated by the DC voltage (FIG. 2B). The refractive index of every cell of the liquid crystal panel 35 differs depending on such states of the molecules, so that an interference pattern of the refractive indexes is reproduced on the liquid crystal panel 35.

By irradiating a coherent light beam (reading light beam) on the liquid crystal panel 35 while the interference patterns are played on it, every ray of the reading light beam refracts and gives the viewer the perception of a continuously reproduced three-dimensional images (or a movie).

In the above described system, interference patterns are once stored in the recorder 36, and then the stored interference patterns are played later. It is of course possible to provide two (or more) sets of the system, and one of them is used for recording and the other is used for simultaneously playing the recorded interference patterns, which constitutes a live transmission (or broadcasting) of a three-dimensional movie.

The same effect may be obtained by using a substitute liquid crystal panel whose alignment layers on the inside surfaces of the plane electrodes have directions perpendicular to each other, and the liquid crystal is formed Cross-Nicole. Such substitution is possible only when the liquid crystal cells have a microscopic size.

Figure 5:
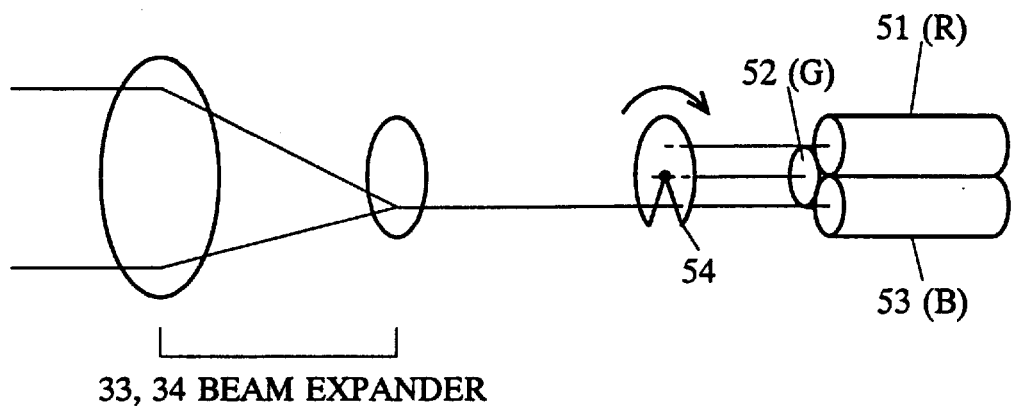
FIG. 5 is a view near the light source of a three-dimensional color movie system.

A color three-dimensional movie system has almost the same construction as the monochromatic one described above, except, as shown in FIG. 5, three laser light sources 51, 52 and 53 are used for the three primary colors (red, green and blue) and a beam chopper 54 is used for chopping the three light beams at high speed to allow one light beam to pass at a time. The light beam passing the beam chopper 54 produces an interference pattern on the liquid crystal panel 35 as described above. When an interference pattern of a color is recorded, the identification of the color is also recorded.

A GaAs semiconductor laser may be used for the red laser light source, a ZnSe semiconductor laser for the green laser light source, and a GaN semiconductor laser for the blue laser light source. Alternatively, InGaN-based semiconductor can be used as the laser light source at various wavelengths.

In playing, based on the color identification data recorded with the interference patterns, the beam chopper 54 is controlled in synchronous with the reproduction of the interference patterns so that the same color as that used in recording the interference pattern is irradiated onto the liquid crystal panel 35. By switching the three colors at high speed, a viewer can see a three-dimensional image of the original colors.

What is claimed is:

1. A three-dimensional movie recording and playing system comprising:

a liquid crystal panel as an image sensor whose alignment layers on inside surfaces of a pair of plane electrodes have a same direction;

a light source for generating a coherent light;

a light splitter for splitting the coherent light into an object light and a reference light; and a recorder for recording a series of images of interference patterns made on the liquid crystal panel by a superposition of the object light arriving at the liquid crystal panel after being reflected by an object and the reference light arriving at the liquid crystal panel directly.

2. A three-dimensional movie recording and playing system comprising:

a liquid crystal panel as an image sensor whose alignment layers on inside surfaces of a pair of plane electrodes have a same direction;

three light sources each for generating a coherent light of a primary color;

a light chopper for switching the three coherent lights cyclically at regular time intervals;

a light splitter for splitting the coherent light from the light chopper into an object light and a reference light; and a recorder for recording a series of images of interference patterns made on the liquid crystal panel by a superposition of the object light arriving at the liquid crystal panel after being reflected by an object and the reference light arriving at the liquid crystal panel directly.

* * * * *